(12) United States Patent  
Fukuda et al.

(10) Patent No.: US 8,434,106 B2  
(45) Date of Patent: Apr. 30, 2013

(54) INFORMATION PROCESSING SYSTEM, SERVER DEVICE, INFORMATION PROCESSING METHOD, AND PROGRAM

(75) Inventors: Kazuhiro Fukuda, Kanagawa (JP); Tetsu Sumita, Tokyo (JP)

(73) Assignees: Sony Corporation (JP); Plat-Ease Corporation (JP)

( * ) Notice: Subject to any disclaimer, the term of this patent is extended or adjusted under 35 U.S.C. 154(b) by 213 days.

(21) Appl. No.: 12/925,341

(22) Filed: Oct. 19, 2010

(65) Prior Publication Data

US 2011/0119303 A1 May 19, 2011

(30) Foreign Application Priority Data

Nov. 16, 2009 (JP) ................................ P2009-261252

(51) Int. Cl.  
*H04N 7/173* (2011.01)

(52) U.S. Cl.  
USPC ................................ 725/39; 725/40; 709/219

(58) Field of Classification Search .............. 725/37–61; 709/217–232  
See application file for complete search history.

(56) References Cited

U.S. PATENT DOCUMENTS

| | | | |
|---|---|---|---|
| 5,822,123 A | 10/1998 | Davis et al. | |
| 6,240,555 B1 * | 5/2001 | Shoff et al. | 725/110 |
| 6,282,713 B1 * | 8/2001 | Kitsukawa et al. | 725/36 |
| 7,487,523 B1 | 2/2009 | Hendricks | |
| 7,493,633 B2 * | 2/2009 | Ikemoto | 720/707 |
| 7,814,406 B2 | 10/2010 | Ozawa et al. | |
| 2007/0220056 A1 | 9/2007 | Arora | |
| 2007/0283259 A1 | 12/2007 | Barry et al. | |
| 2009/0006368 A1 | 1/2009 | Mei et al. | |

FOREIGN PATENT DOCUMENTS

WO 0243353 A2 5/2002

OTHER PUBLICATIONS

European Search Report EP 10189811, dated Mar. 10, 2011.  
M.A. Hearst, P. Smalley and C. Chandler: "Faceted Metadata for Information Architecture and Search", CHI 2006 Course Apr. 22, 2006, XP 002623899, pp. 14, 27, 39, 73, 74, 62, 63, 66.  
Li Y et al: "A hybrid collaborative filtering method for multiple-interests and multiple-content recommendation in E-Commerce", Expert Systems With Applications, Oxford, GB vol. 28, No. 1, Jan. 1, 2005, pp. 67-77. XP004627562.

\* cited by examiner

*Primary Examiner* — Annan Shang  
(74) *Attorney, Agent, or Firm* — Lerner, David, Littenberg, Krumholz & Mentlik, LLP

(57) ABSTRACT

Provided is a server device including a storage unit that stores, for each content, facet data composed of a plurality of facet items and facet values hierarchically arranged in a lower level of each of the plurality of facet items, priorities being assigned to the plurality of facet items, a receiving unit that receives content identifying information for identifying one content from a client terminal, a selection unit that selects one or more than one facet item of the one content and any facet value belonging to each of the one or more than one facet item, an acquisition unit that acquires relevant information of the one content based on a selected facet item and a selected facet value selected by the selection unit, and a transmission unit that transmits the relevant information acquired by the acquisition unit to the client terminal.

9 Claims, 15 Drawing Sheets

INFORMATION PROCESSING SYSTEM, SERVER DEVICE, INFORMATION PROCESSING METHOD, AND PROGRAM

CROSS-REFERENCE TO RELATED APPLICATION

The present application claims priority from Japanese Patent Application No. JP 2009-261252 filed in the Japanese Patent Office on Nov. 16, 2009, the entire content of which is incorporated herein by reference.

BACKGROUND OF THE INVENTION

1. Field of the Invention

The present invention relates to an information processing system, a server device, an information processing method, and a program.

2. Description of the Related Art

Digitization of digital broadcasting is increasingly prevalent today, and, accordingly, an ECG (Electronic Content Guide; or EPG) service that broadcasts information for a program search, superimposed on a broadcast wave, is widely used. The ECG contains a keyword such as a program title, genre or cast, so that a user can search for a desired program by entering such a keyword in a client terminal. The ECG related techniques are disclosed in Japanese Patent No. 4162014, Japanese Patent No. 3993627, Japanese Patent No. 3888388, Japanese Unexamined Patent Publication No. 2000-36796, Japanese Patent Translation Publication 2000-501579, and Japanese Patent Translation Publication 08-506940.

SUMMARY OF THE INVENTION

However, it is inconvenient for a user to make a search by entering a keyword as described above. Further, it is necessary for a user to make a search again by changing a keyword in the cases where the number of programs as search results is small, where a program desired by a user is not included in search results, and where the number of programs as search results is too large, for example.

In light of the foregoing, it is desirable to provide a novel and improved information processing system, server device, information processing method, and program which can extract program-relevant information to be transmitted to a client terminal as well as reducing a user load.

According to an embodiment of the present invention, there is provided an information processing system including a client terminal, and a server device including a storage unit that stores, for each content, facet data composed of a plurality of facet items and facet values hierarchically arranged in a lower level of each of the plurality of facet items, priorities being assigned to the plurality of facet items, a receiving unit that receives content identifying information for identifying one content from the client terminal, a selection unit that selects one or more than one facet item of the one content and any facet value belonging to each of the one or more than one facet item, an acquisition unit that acquires relevant information of the one content based on a selected facet item and a selected facet value selected by the selection unit, and a transmission unit that transmits the relevant information acquired by the acquisition unit to the client terminal. When increasing a number of the relevant information to be acquired by the acquisition unit, the selection unit selects, from a selected facet item with a low priority, instead of a selected facet value belonging to the selected facet item, a facet value arranged in a higher hierarchical level of the selected facet value.

When increasing the number of the relevant information to be acquired by the acquisition unit and when the selected facet value belonging to the selected facet item with the lowest priority is in a highest hierarchical level, the selection unit may clear selection of the selected facet value.

When increasing the number of the relevant information to be acquired by the acquisition unit and when a number of selected facet items is more than one and the selected facet value belonging to the selected facet item with the lowest priority does not exist, the selection unit may clear selection of the selected facet item with the lowest priority.

The receiving unit may further receive a designated number for the relevant information from the client terminal, the selection unit may perform processing for increasing the number of the relevant information until exceeding the designated number, the server device may further includes a relevance calculation unit that calculates a relevance of the one content with each of relevant information acquired based on the selected facet item and the selected facet value selected by the selection unit, and the acquisition unit may acquire the designated number of the relevant information sequentially in descending order of the relevance calculated by the relevance calculation unit.

The acquisition unit may acquire the relevant information of the one content based on a search condition that connects a logical OR of the selected facet values belonging to each of the one or more than one facet item by using a logical AND.

When decreasing the number of the relevant information to be acquired by the acquisition unit, the selection unit may select, instead of the selected facet value belonging to the selected facet item with the lowest priority, a facet value arranged in a lower hierarchical level of the selected facet value.

When decreasing the number of the relevant information to be acquired by the acquisition unit and when the selected facet value belonging to the selected facet item with the lowest priority is in a lowest hierarchical level and when a non-selected facet item exists among the plurality of facet items of the one content, the selection unit may newly select the facet item.

The receiving unit may further receive an increase/decrease request for increasing/decreasing the number of the relevant information from the client terminal, and in response to the increase/decrease request from the client terminal, the selection unit may perform processing for increasing the number of the relevant information or processing for decreasing the number of the relevant information.

According to another embodiment of the present invention, there is provided a server device including a storage unit that stores, for each content, facet data composed of a plurality of facet items and facet values hierarchically arranged in a lower level of each of the plurality of facet items, priorities being assigned to the plurality of facet items, a receiving unit that receives content identifying information for identifying one content from a client terminal, a selection unit that selects one or more than one facet item of the one content and any facet value belonging to each of the one or more than one facet item, an acquisition unit that acquires relevant information of the one content based on a selected facet item and a selected facet value selected by the selection unit, and a transmission unit that transmits the relevant information acquired by the acquisition unit to the client terminal. When increasing a number of the relevant information to be acquired by the acquisition unit, the selection unit may select, from a selected facet item with a low priority, instead of a selected facet value belonging to the selected facet item, a facet value arranged in a higher hierarchical level of the selected facet value.

According to another embodiment of the present invention, there is provided a program causing a computer to function as a server device including a storage unit that stores, for each content, facet data composed of a plurality of facet items and facet values hierarchically arranged in a lower level of each of the plurality of facet items, priorities being assigned to the plurality of facet items, a receiving unit that receives content identifying information for identifying one content from a client terminal, a selection unit that selects one or more than one facet item of the one content and any facet value belonging to each of the one or more than one facet item, an acquisition unit that acquires relevant information of the one content based on a selected facet item and a selected facet value selected by the selection unit, and a transmission unit that transmits the relevant information acquired by the acquisition unit to the client terminal. When increasing a number of the relevant information to be acquired by the acquisition unit, the selection unit may select, from a selected facet item with a low priority, instead of a selected facet value belonging to the selected facet item, a facet value arranged in a higher hierarchical level of the selected facet value.

According to the embodiments of the present invention described above, it is possible to extract program-relevant information to be transmitted to a client terminal as well as reducing a user load.

DETAILED DESCRIPTION OF THE EMBODIMENT(S)

Figure 1:
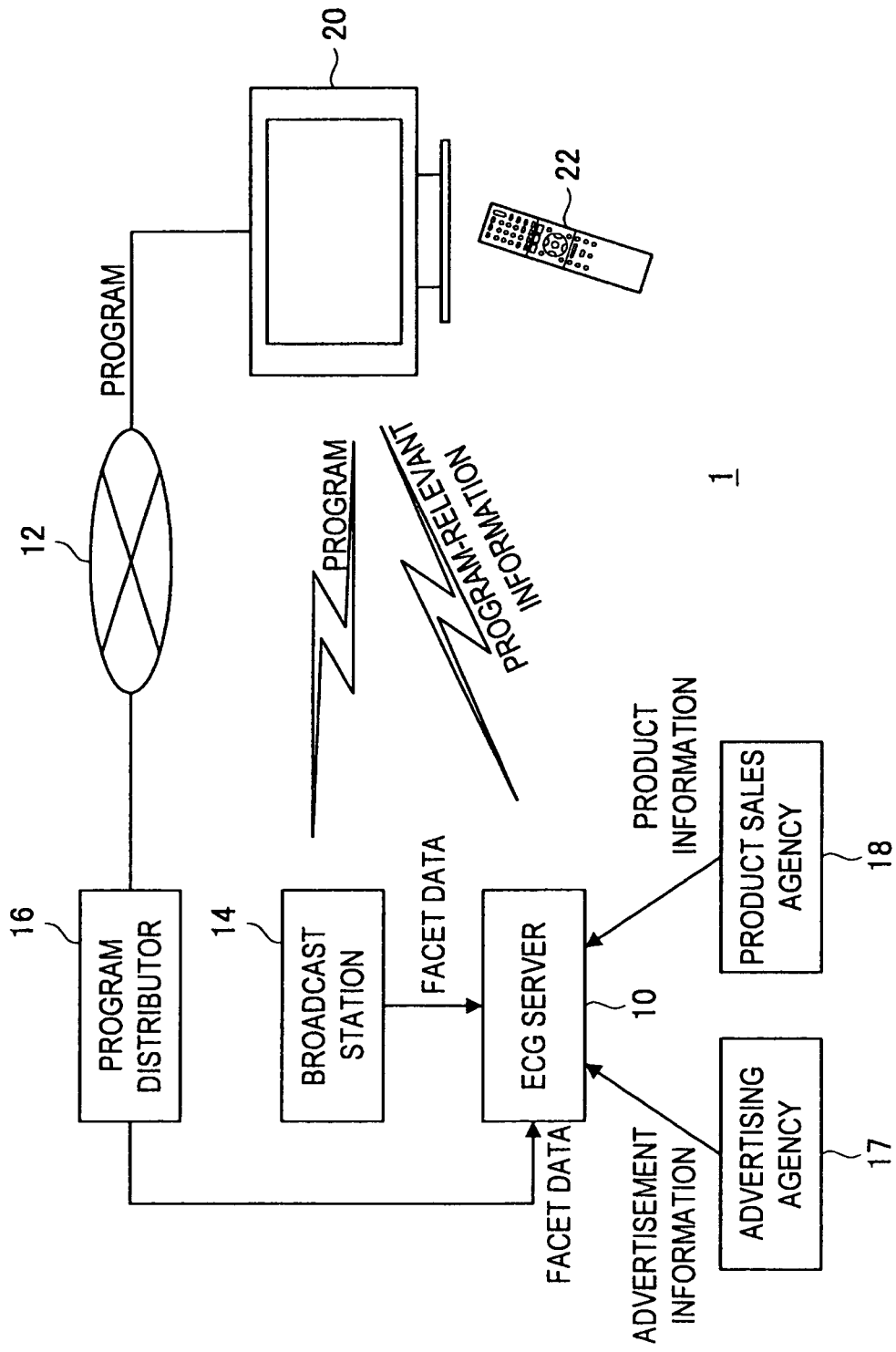
FIG. 1 is an explanatory view showing a configuration of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Overview of Information Processing System According to Embodiment
2. Hardware Configuration of Client Terminal
3. Functions of Client Terminal
4. Functions of ECG Server
  4-1. Process to Automatically Extract Designated Number of Relevant information
  4-2. Process to Automatically Extract Relevant information within Upper Limit
  4-3. Process to Increase or Decrease Number of Relevant information According to User Operation
  4-4. Others
5. Supplementary Explanation
6. Summary <1. Overview of information processing system according to Embodiment>

An information processing system 1 according to an embodiment of the present invention is schematically described hereinafter with reference to FIG. 1.

FIG. 1 is an explanatory view showing a configuration of the information processing system 1 according to the embodiment of the present invention. Referring to FIG. 1, the information processing system 1 according to the embodiment includes an ECG (Electronic Content Guide) server 10, a network 12, a broadcast station 14, a program distributor 16, an advertising agency 17, a product sales agency 18, a client terminal 20, and a remote controller 22.

The broadcast station 14 broadcasts a program entity. Although the case where the broadcast station 14 broadcasts a program by radio is shown in FIG. 1, the broadcast station 14 may broadcast a program by wire. Specifically, the broadcast station 14 may perform digital terrestrial broadcasting, cable television broadcasting, BS (Broadcasting Satellite) digital broadcasting, CS (Communication Satellite) digital broadcasting or the like. Further, the broadcast station 14 may transmit EPG-SI for creating an electronic program guide or performing reservation recording in the client terminal 20.

Note that, although the case where the content is a program is mainly described in this specification, the content is not limited thereto. For example, the content may be video data such as commercial or movie, music data, still image data, game, software or the like.

The program distributor 16 transmits a program entity through the network 12. The program distributor 16 may transmit a program by downloading or streaming, for example. Note that the network 12 is a wired or wireless transmission channel of information which is transmitted from a device connected to the network 12. For example, the network 12 may include a public network such as the Internet, a telephone line network or a satellite communications network, or a leased line network such as various kinds of LAN (Local Area Network) including Ethernet (registered trademark), WAN (Wide Area Network) or IP-VPN (Internet Protocol-Virtual Private Network).

Contents holders such as the broadcast station 14 and the program distributor 16 also have metadata of each program. In this embodiment, those contents holders provide program metadata as facet data to the ECG server 10. The facet data is briefly described hereinbelow.

The facet data contains a plurality of facet items (facet categories), and facet values related to each facet item belong to each of the plurality of facet items. The facet items are mutually exclusive categories, and it is therefore possible to make an approach to the facet value from various angles. For example, the facet items of a program may be "genre", "person", "place", "time" and so on. Further, the facet values which belong to the facet item "genre" may be "drama", "sports", "documentary" and so on, and the facet values which belong to the facet item "person" may be "actor A", "scriptwriter B", "director C" and so on. In this case, a program whose "genre" is "drama" and which has "actor A" as a cast member may be retrieved by a path of the facet item="genre"→the facet value="drama" or by a path of the facet item="person"→the facet value="actor A".

The broadcast station 14 and the program distributor 16 generate such facet data by setting the facet values of each program to the facet items defined by a provider of the ECG server 10, for example. In this embodiment, priorities are assigned to the respective facet items of the facet data. Note that the priorities may be assigned manually or automatically. In the case of manually assigning the priorities, it is assumed that the broadcast station 14 and the program distributor 16 assign a higher priority to a facet item which more strongly indicates the characteristics of a program. For example, when the facet item "person" more definitively characterizes a program than the facet item "genre", a higher priority is assigned to the facet item "person" than to the facet item "genre".

Further, priorities may be also assigned to the respective facet values in addition to the respective facet items of the facet data. For example, when "actor A" who plays the leading part and "actor B" who plays a supporting part exist as the facet values that belong to the facet item "person", a higher priority may be assigned to the facet value "actor A" than to the facet value "actor B".

The ECG server 10 (server device) stores program information for each program broadcasted from the broadcast station 14 or a program distributed from the program distributor 16. The program information may be a program title, synopsis, broadcast time, representative image, staff or the like. The ECG server 10 transmits the program information to the client terminal 20. Note that, when the client terminal 20 receives EPG-SI from the broadcast station 14, the ECG server 10 may selectively transmit information (e.g. image) which is not contained in the EPG-SI. Further, the ECG server 10 stores the facet data of the program which is provided as described above from the broadcast station 14, the program distributor 16 and so on.

The ECG server 10 according to the embodiment extracts relevant information of the program being viewed by a user in the client terminal 20, for example, automatically based on the facet data in which the priorities are assigned to the respective facet items as described above and transmits the extracted relevant information to the client terminal 20. Note that, although the case where the relevant information is program information is mainly described in this specification, the relevant information may be advertisement information which is provided from the advertising agency 17 or product information which is provided from the product sales agency 18.

Further, although the case where the ECG server 10 stores the facet data for each program is described above, the ECG server 10 may store the facet data of a group of a plurality of programs as a unified set. For example, the ECG server 10 may store the facet data of a group composed of a plurality of programs from the first episode to the final episode of the drama "BUZZER BEATER" or the facet data of a group composed of a plurality of feature programs of the same theme such as a special topic or a special project.

The client terminal 20 receives contents broadcasted from the broadcast station 14, contents transmitted from the program distributor 16 or the like and reproduces and displays the contents. The client terminal 20 operates according to a user operation which is performed on the remote controller 22. For example, a user can control the client terminal 20 by performing a channel selection operation, a content selection operation, a viewing reservation operation, a recording reservation operation, or a playback control operation such as fast-forward or pause on the remote controller 22.

Figure 2:
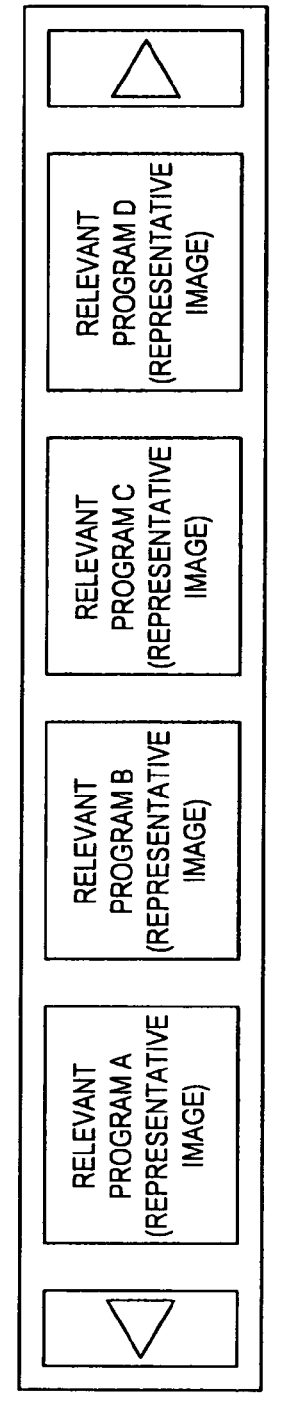
FIG. 2 is an explanatory view showing a display example of relevant information.

Further, during reproduction of a program, for example, the client terminal 20 according to the embodiment can receive relevant information of the program from the ECG server 10 and display the relevant information as shown in FIG. 2.

FIG. 2 is an explanatory view showing a display example of relevant information. As shown in FIG. 2, when the client terminal 20 receives relevant information from the ECG server 10, the client terminal 20 displays the relevant information so as to overlap the program video which is currently reproduced on a display unit 24. Specifically, in the example shown in FIG. 2, the relevant information is relevant program information, and the client terminal 20 displays representative images of the respective relevant programs on the display unit 24. A user can select any one of those relevant programs and perform viewing, reservation recording or the like of the selected relevant program.

Note that the case where the client terminal 20 is a display device is shown in FIG. 2, the client terminal 20 is not limited thereto. For example, the client terminal 20 may be an information processing device such as a PC (Personal Computer), a home video processing device (e.g. a DVD recorder, a videocassette recorder etc.), a PDA (Personal Digital Assistants), a home game device, or an electrical household appliance. Further, the client terminal 20 may be an information processing device such as a mobile phone, a PHS (Personal Handyphone System), a portable music playback device, a portable video processing device, or a portable game device.

<2. Hardware Configuration of Client Terminal>

The information processing system 1 according to the embodiment is schematically described above with reference to FIGS. 1 and 2. Hereinafter, a hardware configuration of the client terminal 20 which is included in the information processing system 1 according to the embodiment is described with reference to FIG. 3.

Figure 3:
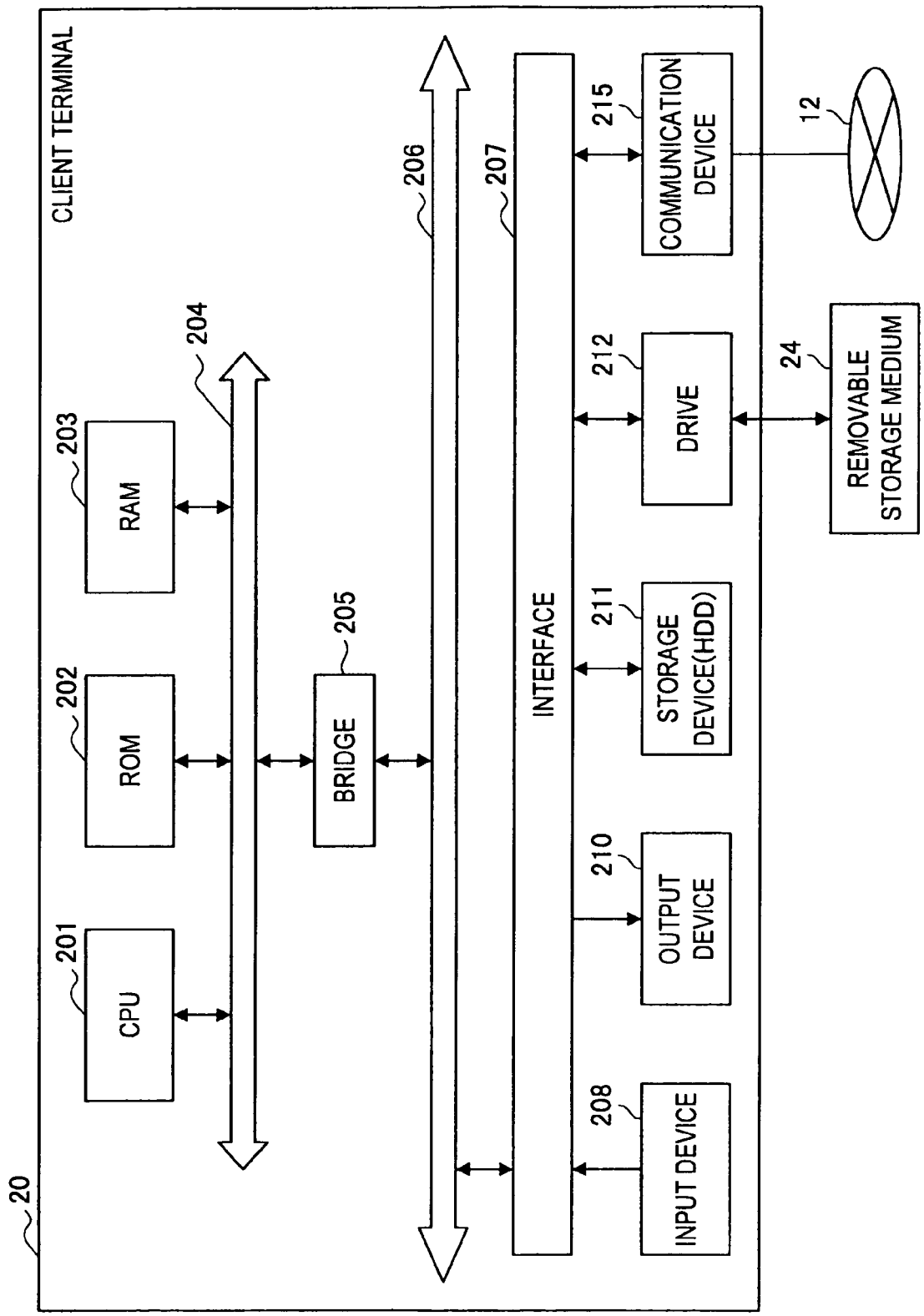
FIG. 3 is a block diagram showing a hardware configuration of a client terminal.

FIG. 3 is a block diagram showing a hardware configuration of the client terminal 20. The client terminal 20 includes a CPU (Central Processing Unit) 201, a ROM (Read Only Memory) 202, a RAM (Random Access Memory) 203, and a host bus 204. The client terminal 20 further includes a bridge 205, an external bus 206, an interface 207, an input device 208, an output device 210, a storage device (HDD) 211, a drive 212, and a communication device 215.

The CPU 201 serves as a processing device and a control device, and it controls the overall operations in the client terminal 20 according to various kinds of programs. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. Note that the host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch, a lever, a photoreceptor for infrared ray signals generated in the remote controller 22 or a receiver of radio signals, and an input control circuit to generate an input signal based on a user input and output it to the CPU 201, for example. A user of the client terminal 20 manipulates the input device 208 to thereby input various kinds of data or direct a processing operation to the client terminal 20.

The output device 210 includes a display device such as a CRT (Cathode Ray Tube) display device, an LCD (Liquid Crystal Display) device, an OLED (Organic Light Emitting Display) device or a lamp. Further, the output device 210 includes a sound output device such as a speaker or a headphone. The output device 210 outputs reproduced contents, for example. Specifically, the display device displays various kinds of information such as reproduced video data by texts or images. On the other hand, the sound output device converts reproduced sound data or the like into sound and outputs the sound.

The storage device 211 is a device for data storage that is configured as an example of a storage unit of the client terminal 20 according to the embodiment. The storage device 211 may include a storage medium, a recording device that records data into the storage medium, a reading device that reads data from the storage medium, a deleting device that deletes data recorded in the storage medium or the like. The storage device 211 may be an HDD (Hard Disc Drive), for example. The storage device 211 drives a hard disk and stores a program to be executed by the CPU 201 or various data.

The drive 212 is a reader/writer for a storage medium, and it may be built in the client terminal 20 or attached externally. The drive 212 reads information that is recorded on a removable storage medium 24 such as a magnetic disk, an optical disk, a magneto-optical disk or a semiconductor memory which is attached thereto and outputs the information to the RAM 203. Further, the drive 212 may write information into the removable storage medium 24.

The communication device 215 is a communication interface that includes a communication device or the like to establish connection with the communication network 12, for example. The communication device 215 may be a communication device compatible with a wireless LAN (Local Area Network) or a wired communication device that performs wired communication.

The hardware configuration of the client terminal 20 is described above with reference to FIG. 3. A hardware configuration of the ECG server 10 may be substantially the same as that of the client terminal 20, and explanation thereof is omitted.

<3. Functions of Client Terminal>

Functions of the client terminal 20 are described hereinafter with reference to FIG. 4.

Figure 4:
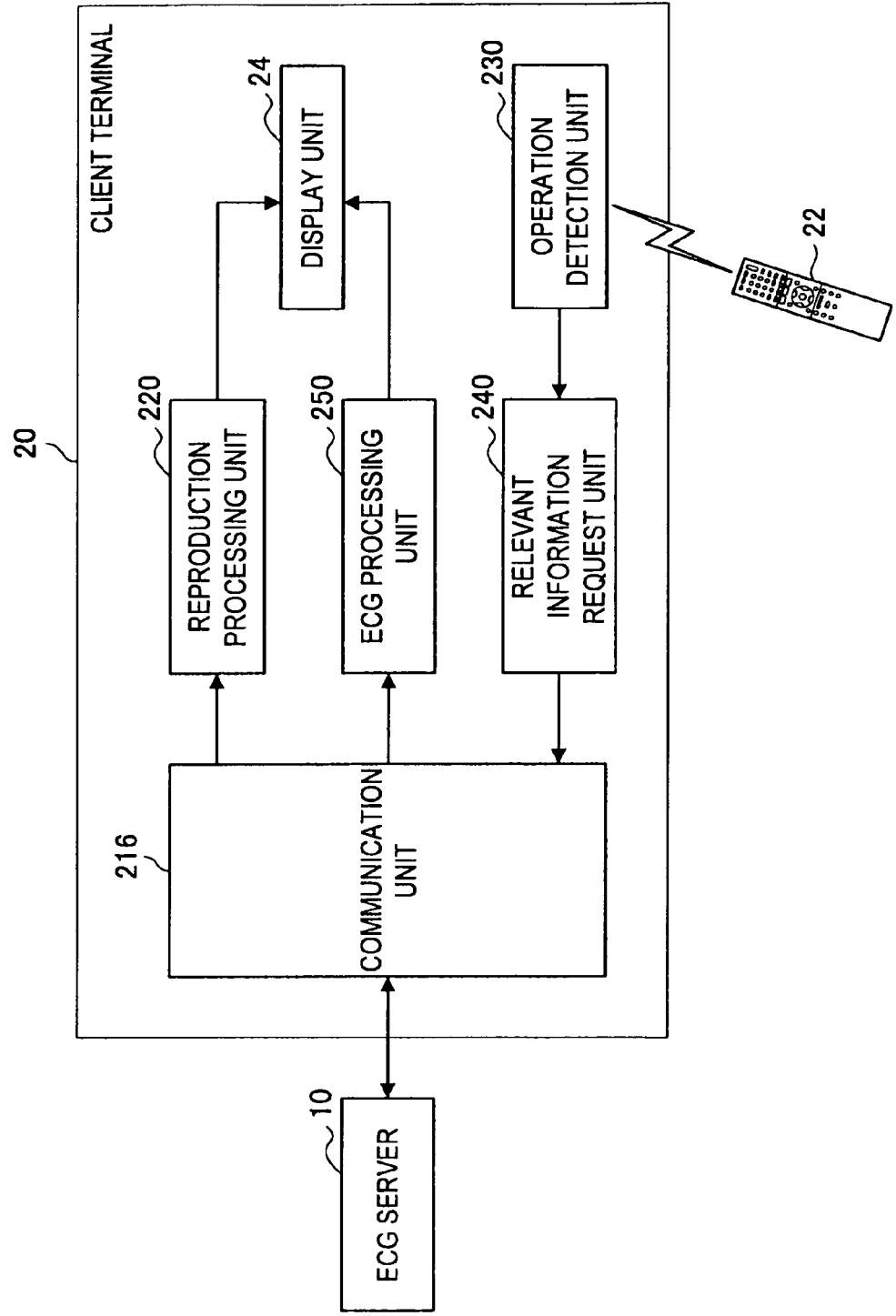
FIG. 4 is a functional block diagram showing a configuration of a client terminal.

FIG. 4 is a functional block diagram showing a configuration of the client terminal 20. Referring to FIG. 4, the client terminal 20 includes a communication unit 216, a reproduction processing unit 220, an operation detection unit 230, a relevant information request unit 240, an ECG processing unit 250, and a display unit 24.

The communication unit 216 is an interface with external parties such as the ECG server 10, the broadcast station 14 and the program distributor 16. The communication unit 216 can receive programs from the broadcast station 14 and the program distributor 16 or receive relevant information of a program being reproduced as ECG from the ECG server 10.

The reproduction processing unit 220 performs reproduction processing of contents received by the communication unit 216. The reproduction processing may be decoding, A/D conversion, rendering or the like.

The operation detection unit 230 detects a user operation by receiving a signal indicating the user operation performed on the remote controller 22 from the remote controller 22. The user operation may be an operation for requesting an increase or a decrease in the number of relevant information transmitted from the ECG server 10, for example. Further, the operation detection unit 230 may detect a user operation performed on an operating means which is placed in the client terminal 20, not only a user operation performed on the remote controller 22.

The relevant information request unit 240 requests the ECG server 10 to transmit relevant information of a program being reproduced. Specifically, the relevant information request unit 240 transmits program identifying information that can identify a program being reproduced to the ECG server 10 through the communication unit 216. The program identifying information may be information indicating a media type, channel number, current time, program ID, program title or the like. Based on the program identifying information, the ECG server 10 can identify a program which is currently reproduced in the client terminal 20.

Further, the relevant information request unit 240 may transmit an acquisition request number such as the upper limit, the lower limit, or the designated number of relevant information to be requested to the ECG server 10. The ECG server 10 can thereby automatically extract the number of relevant information which satisfies the acquisition request number from the client terminal 20 and transmit the extracted relevant information to the client terminal 20 as described in the following "4. Functions of ECG Server".

Furthermore, the relevant information request unit 240 may request an increase or a decrease in the relevant information transmitted from the ECG server 10 based on the user operation which is detected by the operation detection unit 230. For example, the user operation for directing a decrease in relevant information is performed when the number of relevant information received from the ECG server 10 is too large, and the user operation for directing an increase in relevant information is performed when the relevant information desired by a user is not included in the relevant information received from the ECG server 10. The ECG server 10 can thereby automatically increase or decrease the relevant information to be extracted according to a request from the client terminal 20 and transmit the extracted relevant information to the client terminal 20 as described in the following "4. Functions of ECG Server".

The ECG processing unit 250 performs processing for displaying the relevant information which is received as ECG from the ECG server 10 by the communication unit 216.

Specifically, the ECG processing unit 250 creates GUI (Graphical User Interface) of the relevant information. The GUI of the relevant information which is created by the ECG processing unit 250 is displayed overlapping a program video being reproduced on the display unit 24 as shown in FIG. 2, for example.

<4. Functions of ECG Server>

The functions of the client terminal 20 according to the embodiment are described above with reference to FIG. 4. Hereinafter, the functions of the ECG server 10 according to the embodiment are described.

Figure 5:
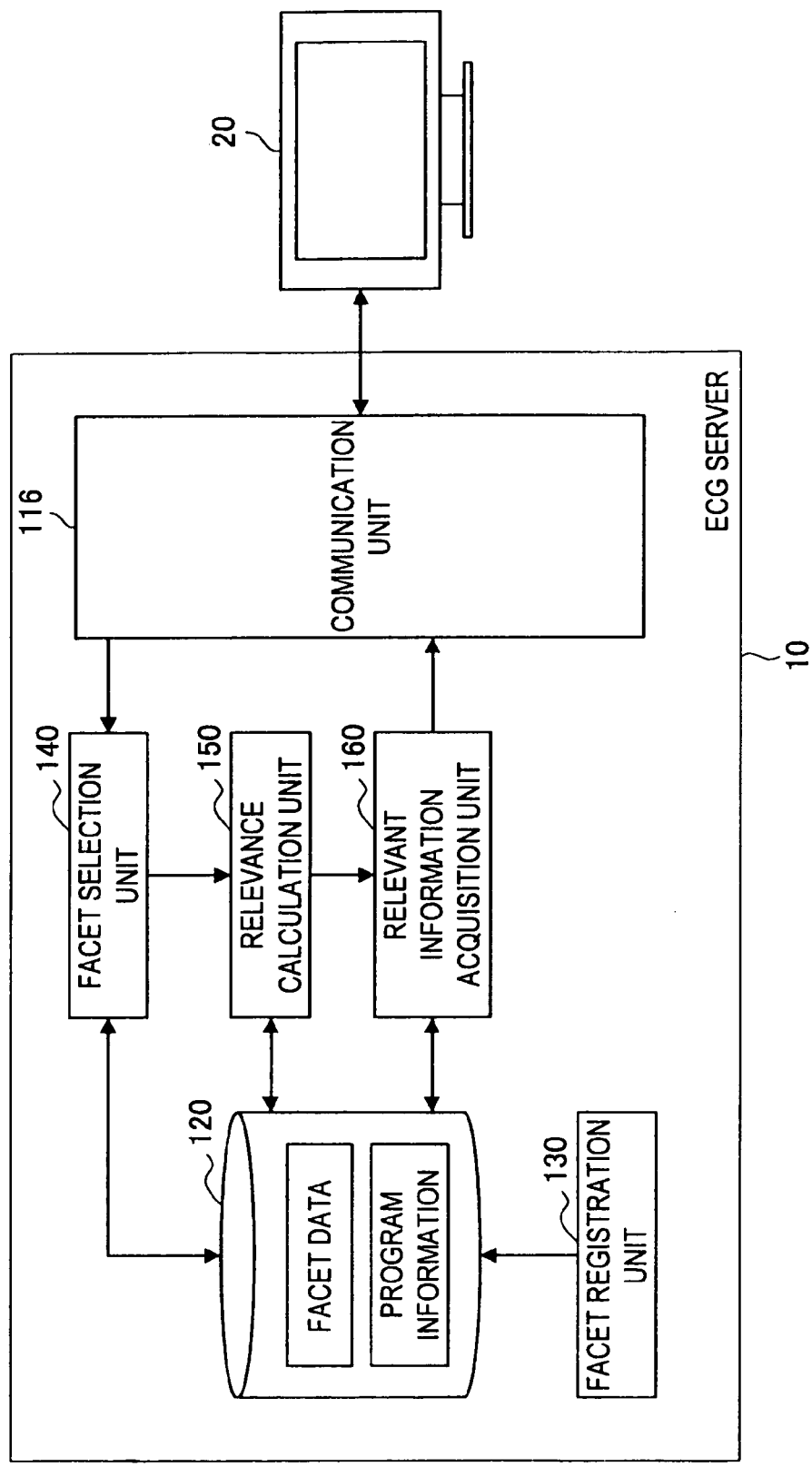
FIG. 5 is a functional block diagram showing a configuration of an ECG server according to the embodiment.

FIG. 5 is a functional block diagram showing a configuration of the ECG server 10 according to the embodiment. Referring to FIG. 5, the ECG server 10 according to the embodiment includes a communication unit 116, a storage unit 120, a facet registration unit 130, a facet selection unit 140, a relevance calculation unit 150, and a relevant information acquisition unit 160.

The communication unit 116 is an interface with the client terminal 20, and functions as a transmitting unit and a receiving unit that respectively transmits and receives various kinds of information with the client terminal 20. For example, the communication unit 116 receives the program identifying information from the client terminal 20 and transmits the relevant information acquired by the relevant information acquisition unit 160 to the client terminal 20.

The storage unit 120 stores program information for each program broadcasted from the broadcast station 14 or a program distributed from the program distributor 16. Further, in the storage unit 120, facet data is registered for each program by the facet registration unit 130. The facet data is composed of facet items and facet values, and priorities (weights) are assigned to the respective facet items as briefly described in "1. Overview of Information Processing System According to Embodiment". The facet data is specifically described hereinafter with reference to FIG. 6.

Figure 6:
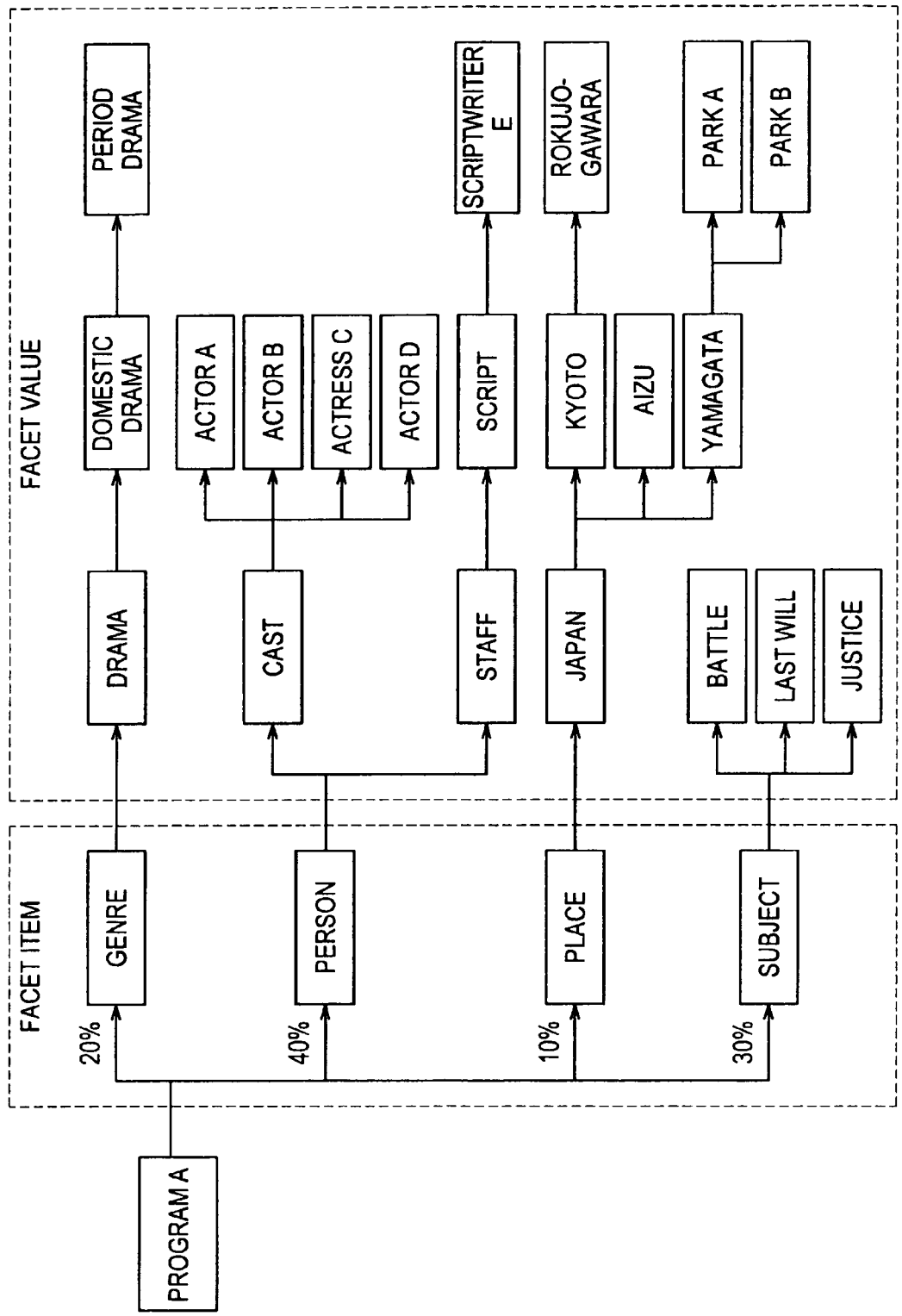
FIG. 6 is an explanatory view showing a specific example of facet data of a program A.

FIG. 6 is an explanatory view showing a specific example of the facet data of a program A. Referring to FIG. 6, the facet data of the program A includes a plurality of facet items "genre", "person", "place" and "subject". In those facet items, a plurality of facet values indicating the subordinate concepts of the respective facet items are organized in a hierarchical fashion.

For example, the facet value "drama" is placed in the highest hierarchical level of the facet item "genre", the facet value "domestic drama" is placed in the lower level of the facet value "drama", and the facet value "period drama" is placed in the lowest hierarchical level of the facet item "genre", which is the lower level of the facet value "domestic drama".

Further, priorities are assigned to the respective facet items constituting the facet data according to the embodiment in such a way that the percentages of the respective facet items are 100% in total. Specifically, the priority "20%" is assigned to the facet item "genre", the priority "40%" is assigned to the facet item "person", the priority "10%" is assigned to the facet item "place", and the priority "30%" is assigned to the facet item "subject". In this case, the priority of the facet item "person" is the highest, which indicates that the facet item "person" is the facet item that most definitively characterizes the program A. On the other hand, the priority of the facet item "place" is the lowest, which indicates that the relation of the facet item "place" with the characteristics of the program A is relatively low.

Note that, although the case where the priorities are assigned in such a way that the percentages of the respective facet items are 100% in total is shown in FIG. 6, the embodiment is not limited thereto. For example, the order of precedence such as "1", "2" and "3" may be assigned as the priorities.

Further, the priorities may be assigned manually by an operator operating the facet registration unit 130 or assigned automatically by the facet registration unit 130. For example, the facet registration unit 130 may assign a higher priority as the depth or the width of the hierarchy of the facet value which belongs to the facet item is larger.

Referring back to FIG. 5, the configuration of the ECG server 10 is further described hereinbelow. When the program identifying information is received from the client terminal 20 by the communication unit 116, the facet selection unit 140 selects the facet item and the facet value to be used for a search of relevant information from the facet data of a target program which is identified by the program identifying information. The selection of the facet item and the facet value are described in detail later.

The relevance calculation unit 150 searches for the facet data of another program by using the facet item and the facet value which are selected by the facet selection unit 140, and calculates a relevance between the facet data of the target program and the facet data of another program.

Note that the search of the facet data may be performed on the basis of a search condition that connects the logical OR of the selected facet values which belong to the respective selected facet items by using AND. For example, in the example shown in FIG. 6, when the facet items "genre" and "person", and the facet values "period drama", "actor A", "actor B", "actress C", "actor D" and "staff" are selected, the facet data that coincides with the following search condition is retrieved.

(genre/drama/domestic drama/period drama)

AND (person/cast/actorA or person/cast/actorB or person/cast/actressC or person/cast/actorD or person/staff)

The relevant information acquisition unit 160 acquires from the storage unit 120 a designated number of program information of other programs in descending order of the relevance calculated by the relevance calculation unit 150. Then, the communication unit 116 transmits the program information of other programs acquired by the relevant information acquisition unit 160 as relevant information of the target program to the client terminal 20. The client terminal 20 can thereby acquire and display the relevant information of the target program.

The configuration of the ECG server 10 is briefly described above. Hereinafter, various processes performed in the ECG server 10 are described in detail.

(4-1. Process to Automatically Extract Designated Number of Relevant Information)

Referring first to FIGS. 7 to 10, a process to automatically extract a designated number of relevant information from the client terminal 20 is described.

Figure 7:
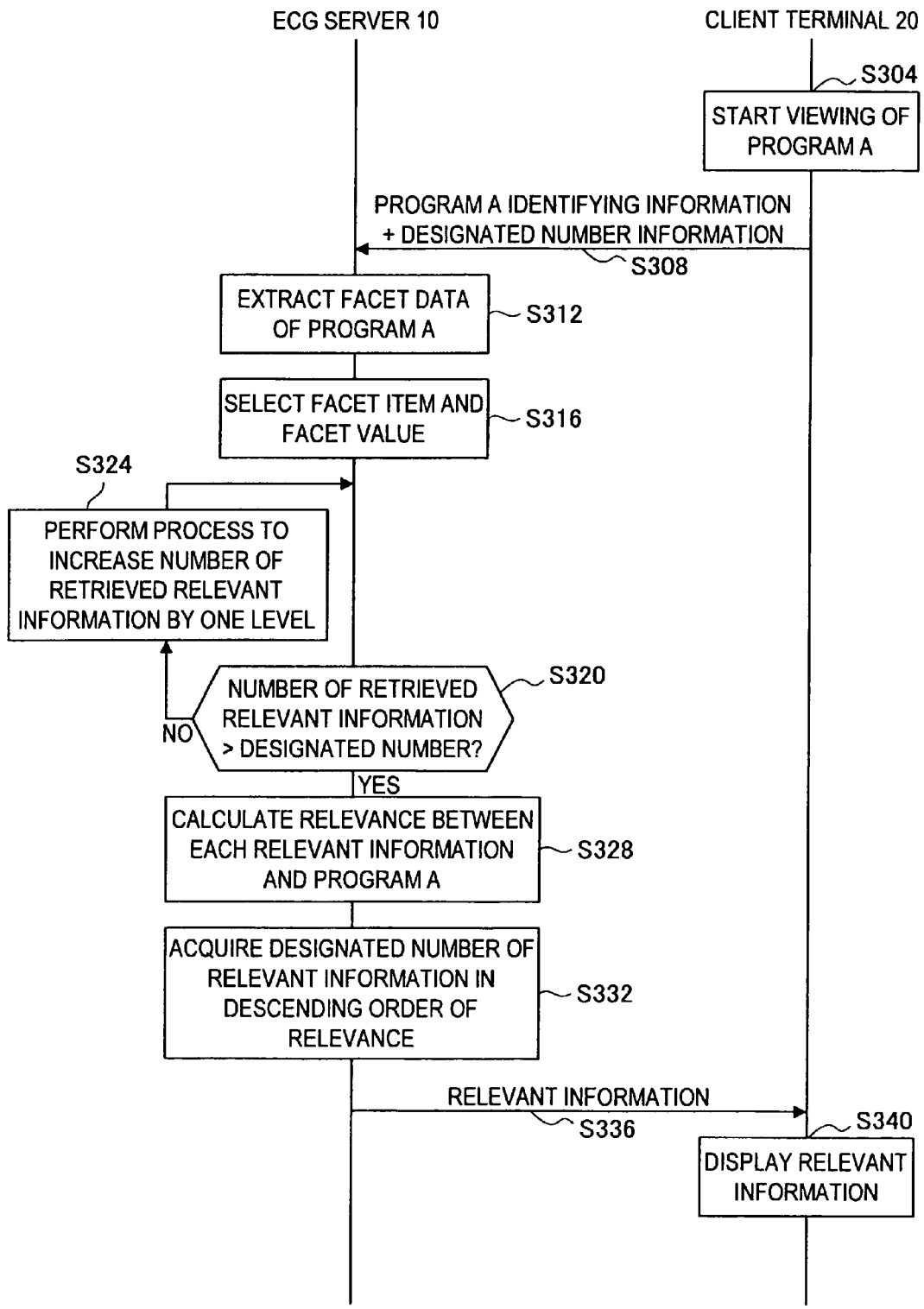
FIG. 7 is a sequence chart showing a process for an ECG server to automatically extract a designated number of relevant information.

FIG. 7 is a sequence chart showing a process for the ECG server 10 to automatically extract a designated number of relevant information. Referring to FIG. 7, when viewing of the program A is started in the client terminal 20 (S304), and the program identifying information for identifying the program A and the designated number information are transmitted from the client terminal 20 (S308), the facet selection unit 140 extracts the facet data of the program A from the storage unit 120 (S312).

The designated number information is information that indicates the designated number of relevant information to be requested from the client terminal 20 to the ECG server 10. For example, the designated number information may be the actual designated number or information indicating a device type, specifications or the like of the client terminal 20. When the designated number information is the information indicating a device type, specifications or the like of the client terminal 20, the ECG server 10 specifies the designated number which corresponds to the device type or specifications. For example, the ECG server 10 may specify the designated number as "20" when the client terminal 20 is a PC, and specify the designated number as "5" when the client terminal 20 is a mobile phone with a small display screen.

Then, the facet selection unit 140 selects facet items and facet values from the facet data of the program A (S316). It is assumed in this example that the facet selection unit 140 selects all facet items of the program A and all facet values in the lowest hierarchical level of the respective facet items.

After that, until the number of relevant information which is retrieved based on the selected facet items and the selected facet values becomes larger than the designated number (S320), the facet selection unit 140 performs a process to increase the number of retrieved relevant information by one level (S324). The process to increase the number of retrieved relevant information by one level is described hereinafter in detail with reference to FIGS. 8 and 9.

Figure 8:
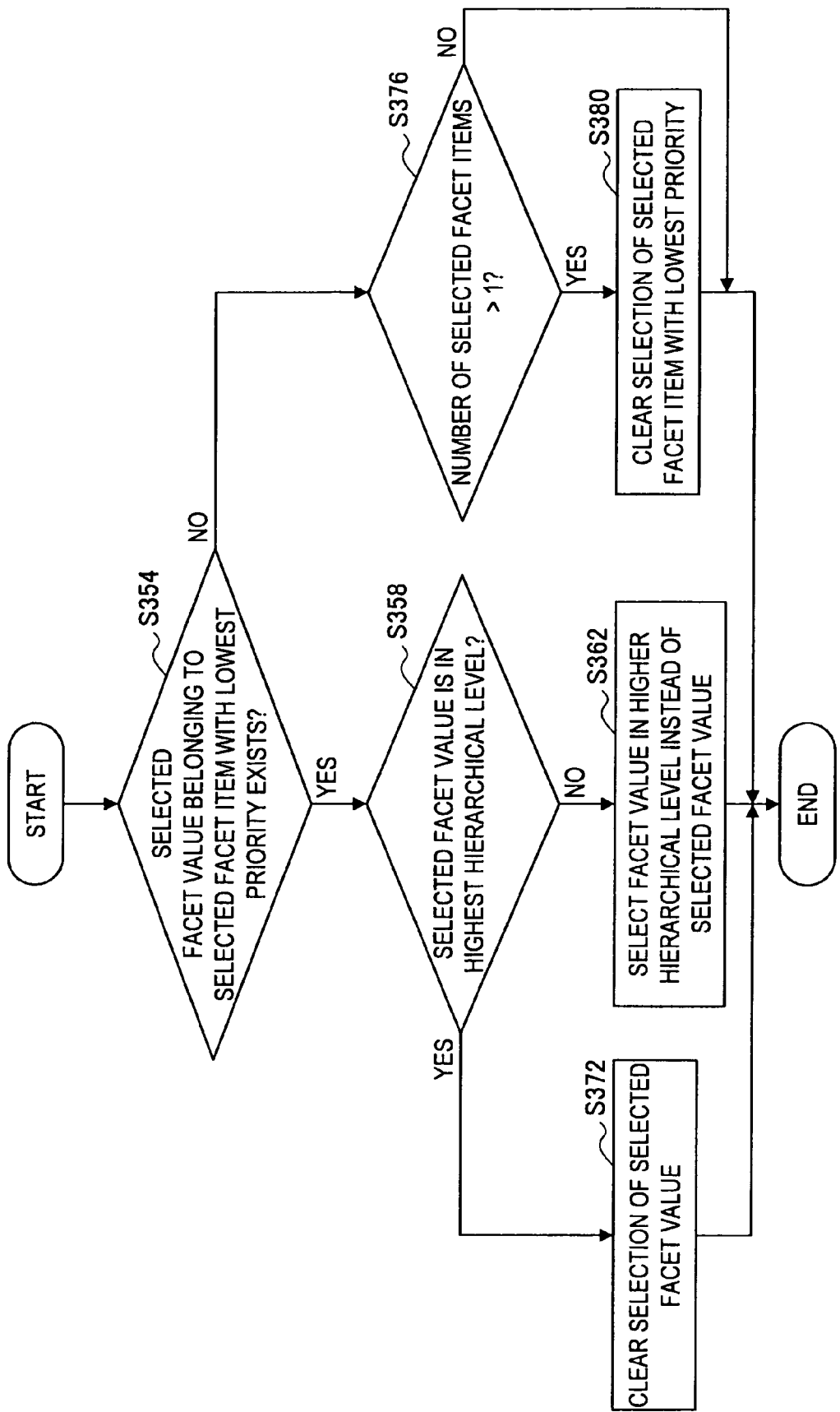
FIG. 8 is a flowchart showing a process to increase the number of retrieved relevant information by one level.

FIG. 8 is a flowchart showing a process to increase the number of retrieved relevant information by one level. When the facet value which belongs to the selected facet item with the lowest priority is selected (S354), and the facet value is not in the highest hierarchical level (S358), the facet selection unit 140 selects the facet value in the higher level instead of the currently selected facet value (S362).

For example, in the facet data shown in FIG. 6, when the facet values "Kyoto", "Aizu" and "Yamagata" which belong to the selected facet item "place" with the lowest priority are selected, the facet selection unit 140 selects the facet value "Japan" in the higher hierarchical level instead of the facet values "Kyoto", "Aizu" and "Yamagata".

Further, when the facet value which belongs to the selected facet item with the lowest priority is selected (S354), and the facet value is in the highest hierarchical level (S358), the facet selection unit 140 clears the selection of the facet value (S372).

For example, in the facet data shown in FIG. 6, when the facet value "Japan" in the highest hierarchical level which belongs to the selected facet item "place" with the lowest priority is selected, the facet selection unit 140 clears the selection of the facet value "Japan". Note that, in this case, the facet selection unit 140 may simultaneously clear the selection of the selected facet item "place".

On the other hand, when any facet value which belongs to the selected facet item with the lowest priority is not selected (S354), and the number of selected facet items is two or more (S376), the facet selection unit 140 clears the selection of the selected facet item with the lowest priority (S380).

For example, in the facet data shown in FIG. 6, when the facet item "place" with the lowest priority is selected, but any facet value which belongs to the facet item "place" is not selected, the facet selection unit 140 clears the selection of the facet item "place".

Figure 9:
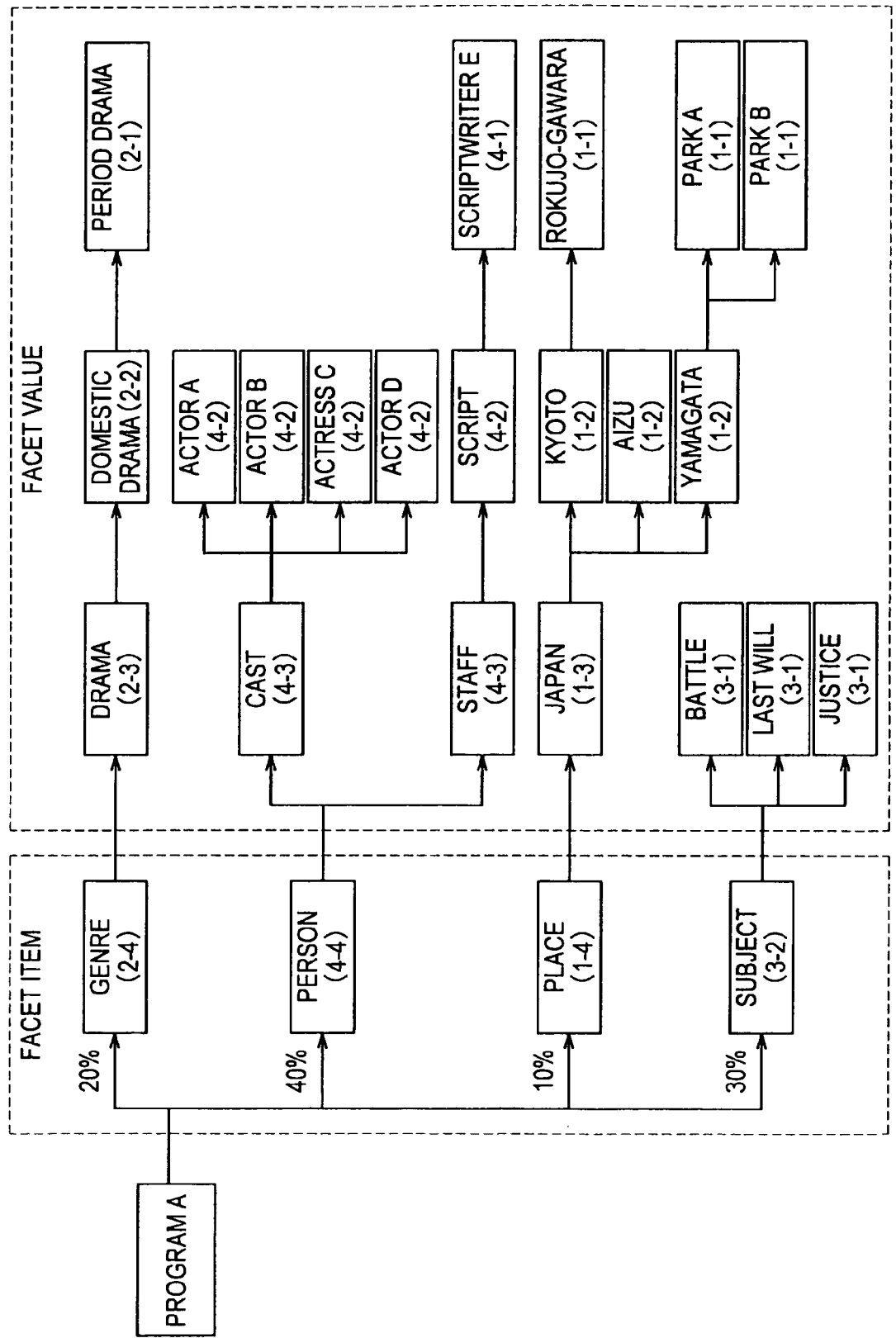
FIG. 9 is an explanatory view showing a way selected facet items and selected facet values are changing by the process shown in FIG. 8.

FIG. 9 is an explanatory view showing a way the selected facet items and the selected facet values are changing by the process shown in FIG. 8. Specifically, FIG. 9 shows, in parentheses, the order of changing or clearing the selection of all facet values and the facet items from the state where all facet items and all facet values in the lowest hierarchical level of each of the facet items are selected.

To be more precise, the selection of the facet values and the facet items are changed or cleared in the order of (1-1), . . . (1-4), (2-1) . . . (2-4), (3-1), (3-2), (4-1) . . . (4-4).

Specifically, at the start, the facet value "Kyoto" is selected instead of the facet value "Rokujo-Gawara", and the facet value "Yamagata" is selected instead of the facet values "park A" and "park B" (1-1). Next, the facet value "Japan" is selected instead of the facet values "Kyoto", "Aizu" and "Yamagata" (1-2). Then, the selection of the facet value "Japan" is cleared (1-3), and then the selection of the facet item "place" is cleared (1-4). After that, the similar processing is performed sequentially from the facet item with the lower priority.

Note that, when the facet items with the same priority exist, the facet item with the more recent registration date of the priority may be treated in preference. Alternatively, the facet item with the larger number of facet values belonging thereto may be treated in preference. Further, alternatively, the facet item with the larger depth or width of the hierarchy of the facet value belonging thereto may be treated in preference.

Further, the number of facet data of other programs (i.e. the number of relevant information) which coincides with the search condition based on the selected facet item and the selected facet value may be specified in advance. This eliminates the need for making a search each time the facet selection unit 140 changes the selected facet item and the selected facet value, thereby enabling reduction of a processing load and improvement of a processing speed.

Referring back to FIG. 7, the overall sequence is further described. When the number of relevant information which is retrieved based on the selected facet item and the selected facet value becomes larger than the designated number in S320, the relevance calculation unit 150 calculates a relevance between the program A and each of the retrieved relevant information by a method which is described later with reference to FIG. 10 (S328).

Then, the relevant information acquisition unit 160 acquires from the storage unit 120 the designated number of relevant information (relevant program information) in descending order of the relevance calculated by the relevance calculation unit 150 (S332), and the communication unit 116 transmits the designated number of relevant information to the client terminal 20 (S336). The client terminal 20 can thereby display the relevant information of the program A being viewed so as to overlap the video of the program A, for example (S340).

Hereinafter, a calculation example of a relevance by the relevance calculation unit 150 is described.

The relevance calculation unit 150 calculates a relevance between a target program and each relevant program by adding up the priorities assigned to the facet items which coincide with the facet items included in the search condition among the facet items of the retrieved relevant information. When a plurality of facet values which belong to one facet item of a relevant program coincide with the plurality of selected facet values included in the search condition, the relevance calculation unit 150 uses a value multiplied by the number of coincidences with the priority assigned to the facet item as a priority of the facet item.

Further, the relevance calculation unit 150 determines whether there is a facet value which coincides with the facet value in the lower level than the facet value included in the search condition among the facet values contained in the facet data of a target program. When there is the coinciding facet value, the relevance calculation unit 150 increases the priority of the facet item to which the coinciding facet value belongs. This is described more specifically with reference to FIG. 10.

Figure 10:
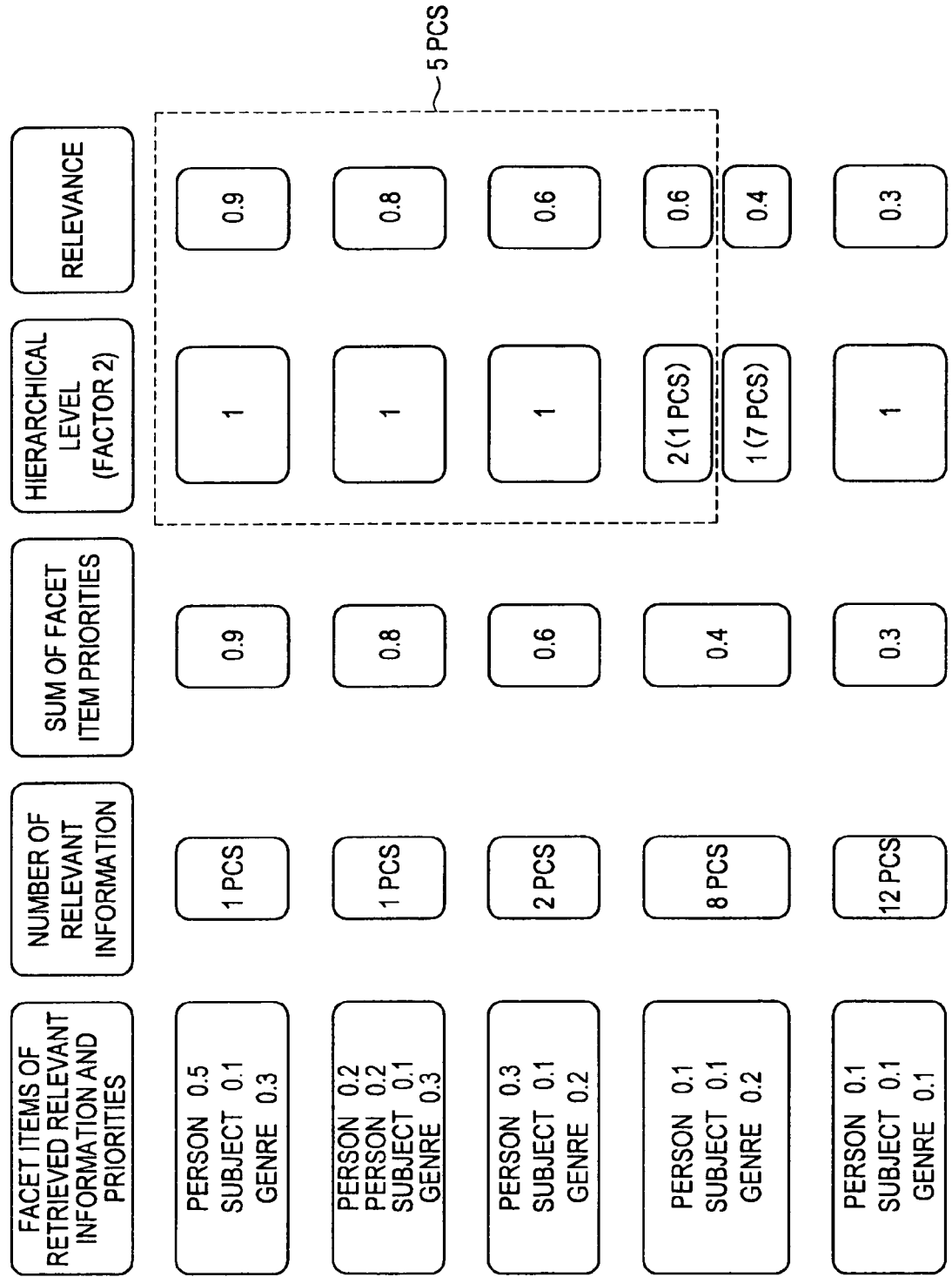
FIG. 10 is an explanatory view showing a specific example of a relevance of a relevant program calculated by a relevant information calculation unit.

FIG. 10 is an explanatory view showing a specific example of a relevance of a relevant program which is calculated by the relevance calculation unit 150. The leftmost column of FIG. 10 indicates the facet items which coincide with the facet items included in the search condition among the facet items of the retrieved relevant information, and the priorities of the respective facet items. Specifically, FIG. 10 shows the case where the facet items included in the search condition are "person", "subject" and "genre". Note that, in FIG. 10, the priority is expressed in "0.5", which is a ratio to 100%, rather than "50%".

When two facet values included in the facet item "person" of a relevant program coincide with two facet values included in the search condition, the priority "0.2" of the facet item "person" is added twice as shown in the second row of FIG. 10.

Further, the number of relevant information shown in FIG. 10 indicates the number of relevant information having the facet items and the priorities shown in the left column. For example, the number of relevant information in which the facet item "person" has the priority "0.5", the facet item "subject" has the priority "0.1", and the facet item "genre" has the priority "0.3" is 1.

The relevance calculation unit 150 determines whether there is a facet value which coincides with the facet value in the lower level than the facet value included in the search condition among the facet values contained in the facet data of a target program with respect to each relevant program. Then, when there is the coinciding facet value, the relevance calculation unit 150 multiplies a hierarchical level difference from the facet value included in the search condition by the priority of the corresponding facet item and a predetermined factor (e.g. 2) and uses a multiplication result as the priority of the relevant facet item. Then, the relevance calculation unit 150 adds up the priorities of the respective facet items (including the priority after correction by multiplication) of the relevant program and thereby calculates a relevance.

For example, it is assumed that one relevant information of the relevant information in which the facet item "person" has the priority "0.1", the facet item "subject" has the priority "0.1", and the facet item "genre" has the priority "0.2" shown in FIG. 10 is relevant information X. Further, it is assumed that the facet values "domestic drama" and "period drama" belong to the facet item "genre" of the relevant information X, and the facet value "domestic drama" is included but the facet value "period drama" is not included in the search condition.

In such a case, the relevance calculation unit 150 multiplies a hierarchical level difference "1" between the facet value "domestic drama" included in the search condition and the facet value "period drama" by the priority "0.2" of the facet item "genre" and the predetermined factor 2, and uses a multiplication result "0.4" as the priority of the facet item "genre". Then, the relevance calculation unit 150 calculates a relevance between the relevant program X and the target program as "0.6" by adding up the priority "0.1" of the facet item "person", the priority "0.1" of the facet item "subject" and the corrected priority "0.4" of the facet item "genre".

When the relevances shown in FIG. 10 are calculated for the respective relevant programs in the above manner, the relevant information acquisition unit 160 acquires the designated number of relevant information in descending order of the relevance. For example, when the designated number is "5", the relevant information acquisition unit 160 acquires the five relevant information which are surrounded by the dotted line in FIG. 10.

As described above, the ECG server 10 according to the embodiment can automatically acquire a designated number of relevant information of a program which is identified by program identifying information received from the client terminal 20 by using facet data in which priorities are assigned to facet items and transmit the designated number of relevant information to the client terminal 20.

(4-2. Process to Automatically Extract Relevant Information Within Upper Limit)

Next, a process to automatically extract relevant information within an upper limit when the upper limit number of relevant information is specified from the client terminal 20 is described hereinbelow.

Figure 11:
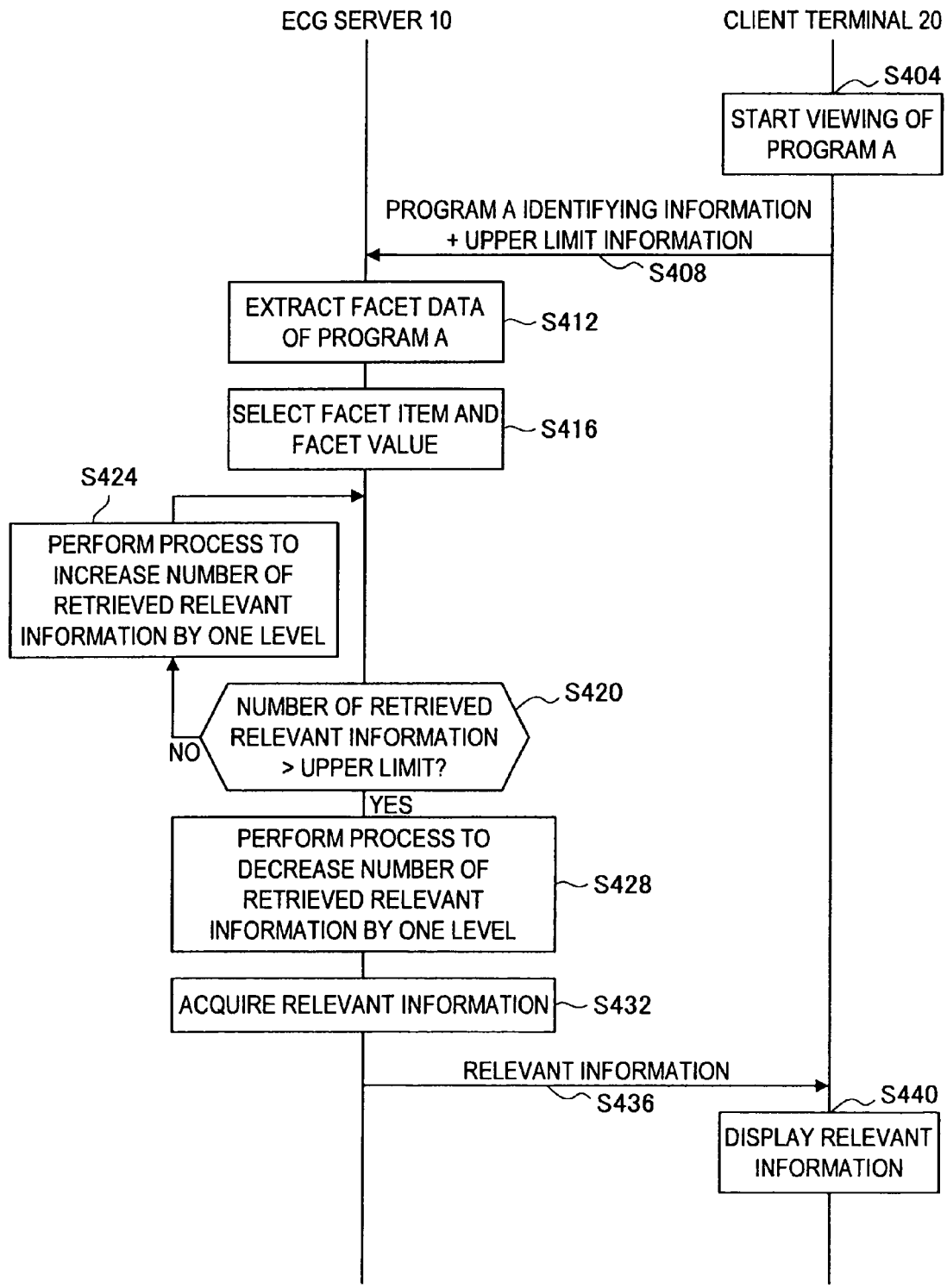
FIG. 11 is a sequence chart showing a process for an ECG server to automatically extract relevant information within an upper limit.

FIG. 11 is a sequence chart showing a process for the ECG server 10 to automatically extract relevant information within the upper limit. Referring to FIG. 11, when viewing of the program A is started in the client terminal 20 (S404), and program identifying information for identifying the program A and upper limit information are transmitted from the client terminal 20 (S408), the facet selection unit 140 extracts facet data of the program A from the storage unit 120 (S412).

The upper limit information is information indicating the upper limit number of relevant information to be requested from the client terminal 20 to the ECG server 10. For example, the upper limit information may be the actual upper limit number or information indicating a device type, specifications or the like of the client terminal 20. When the upper limit information is the information indicating a device type, specifications or the like of the client terminal 20, the ECG server 10 specifies the upper limit number which corresponds to the device type or specifications. For example, the ECG server 10 may specify the upper limit number as "20" when the client terminal 20 is a PC, and specify the upper limit number as "5" when the client terminal 20 is a mobile phone with a small display screen.

Then, the facet selection unit 140 selects facet items and facet values from the facet data of the program A (S416). It is assumed in this example that the facet selection unit 140 selects all facet items of the program A and all facet values in the lowest hierarchical level of the respective facet items.

After that, until the number of relevant information which is retrieved based on the selected facet item and the selected facet value becomes larger than the upper limit (S420), the facet selection unit 140 performs a process to increase the number of retrieved relevant information by one level (S424). The process to increase the number of relevant information by one level is as described earlier with reference to FIGS. 8 and 9.

When the number of relevant information which is retrieved based on the selected facet item and the selected facet value becomes larger than the upper limit in S420, the facet selection unit 140 performs a process to decrease the number of retrieved relevant information by one level (S428).

Specifically, the facet selection unit 140 sets the selected facet items and the selected facet values back to the state before the latest process to increase the number of relevant information by one level. For example, when the selection of the facet value "Japan" is cleared by the latest process to increase the number of relevant information by one level, the facet value "Japan" is selected again by the process to decrease the number of retrieved relevant information by one level.

Note that the process to decrease the number of relevant information by one level is equivalent to select a facet value arranged in the lower hierarchical level of the selected facet value instead of the selected facet value which belongs to the selected facet item with the lowest priority. Further, the process is equivalent to, when the selected facet value which belongs to the selected facet item with the lowest priority is in the lowest hierarchical level and when there is a non-selected facet item among the plurality of facet items of the one content, newly select the facet item.

After S428, the relevant information acquisition unit 160 acquires the relevant information which coincides with the search condition based on the facet item and the facet value selected by the facet selection unit 140 from the storage unit 120 (S432), and the communication unit 116 transmits the relevant information within the upper limit to the client terminal 20 (S436). The client terminal 20 can thereby display the relevant information of the program A being viewed so as to overlap the video of the program A, for example (S440).

(4-3. Process to Increase or Decrease Number of Relevant Information According to User Operation)

Although the case where the ECG server 10 automatically retrieve the relevant information is described above, the ECG server 10 may increase or decrease the number of relevant information according to a user operation.

Figure 12:
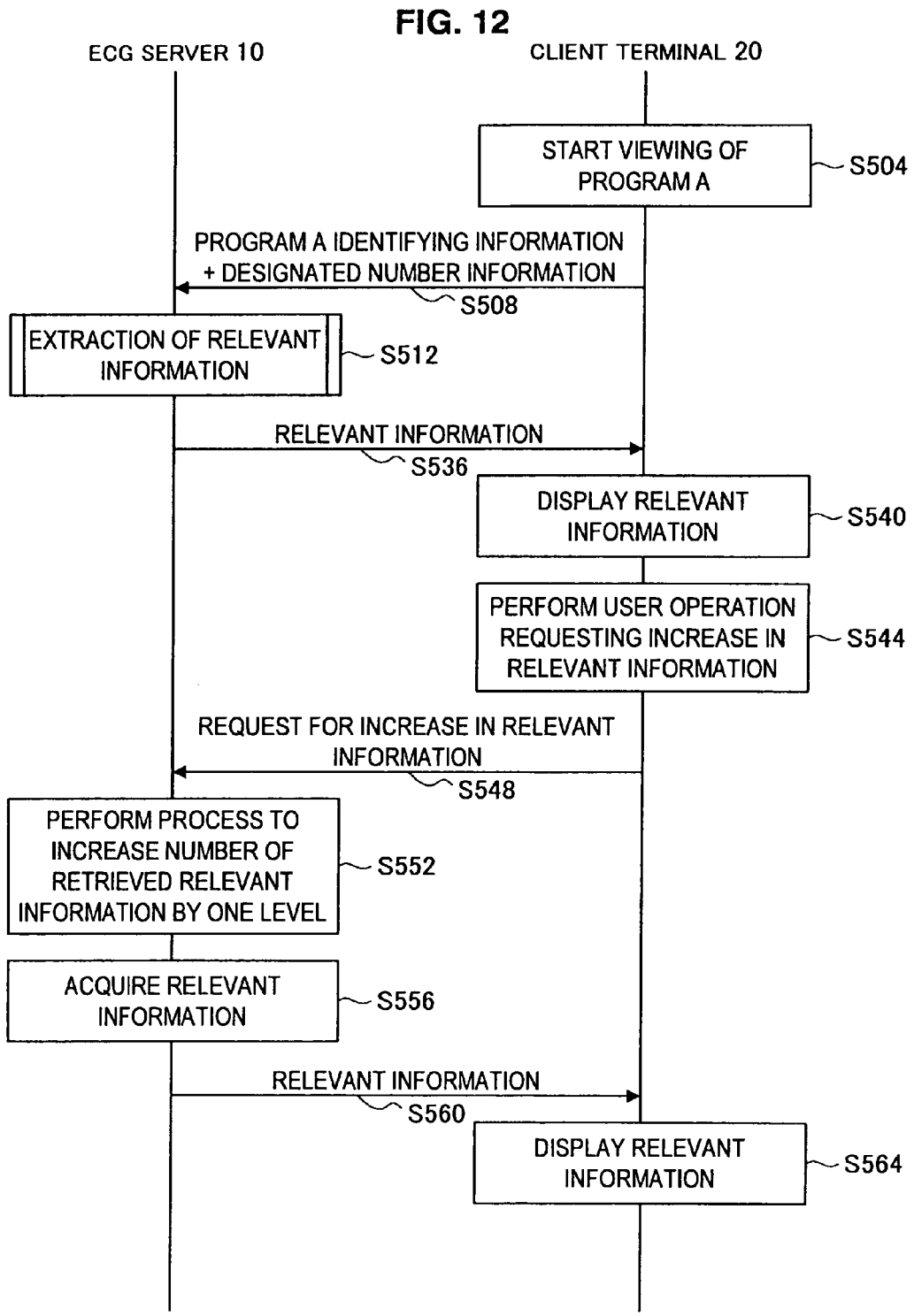
FIG. 12 is a sequence chart showing a flow of a process for an ECG server to increase or decrease the number of relevant information according to a user operation.

FIG. 12 is a sequence chart showing a flow of a process for the ECG server 10 to increase or decrease the number of relevant information according to a user operation. Referring to FIG. 12, when viewing of the program A is started in the client terminal 20 (S504), and program identifying information for identifying the program A and designated number information are transmitted from the client terminal 20 (S508), the ECG server 10 extracts the relevant information by the above-described method (S512), and transmits the designated number of relevant information to the client terminal 20 (S536). The relevant information of the program A is thereby displayed on the client terminal 20 (S540).

After that, when a user operation that requests an increase in the relevant information is detected by the operation detection unit 230 of the client terminal 20 (S544), the relevant information request unit 240 makes a request for increasing the relevant information to the ECG server 10 (S548). A user operation that requests an increase in the relevant information may be a selection operation of an up key of a four-way controller placed on the remote controller 22, for example.

In response to the increase request from the client terminal 20, the facet selection unit 140 of the ECG server 10 performs a process to increase the number of retrieved relevant information by one level (S552). The process to increase the number of retrieved relevant information by one level is as described earlier with reference to FIGS. 8 and 9.

After S552, the relevant information acquisition unit 160 acquires the relevant information which coincides with the search condition based on the facet item and the facet value selected by the facet selection unit 140 from the storage unit 120 (S556), and the communication unit 116 transmits the newly acquired relevant information to the client terminal 20 (S560). The client terminal 20 can thereby display the new relevant information relevant to the program A being viewed (S564).

Note that, in S560, the ECG server 10 may transmit all of the relevant information which coincide with the search condition based on the facet item and the facet value selected by the facet selection unit 140 or transmit only the increment of relevant information from the relevant information which has been transmitted in S536.

Further, although the case where the relevant information is increased according to a user operation is described above, the relevant information may be decreased in the similar manner. Specifically, when a user operation for decreasing the relevant information (e.g. a selection operation of a down key of the remote controller 22) is performed in the client terminal 20, the ECG server 10 may perform a process to decrease the number of retrieved relevant information by one level.

(4-4. Others)

Further, the ECG server 10 may perform the following process when a specific user operation is detected in the client terminal 20.

Specifically, the ECG server 10 performs extraction of a relevant program again by setting the relevant program with the highest relevance with the target program as a new target program.

Then the ECG server 10 accesses a dictionary of the facet value in one hierarchical level higher than the selected facet value of the selected facet item with the lowest priority, and selects any one of the facet values defined by the dictionary, excluding the currently selected facet value. For example, when the selected facet value of the selected facet item with the lowest priority is "Kyoto", the ECG server 10 accesses the dictionary of the facet value "Japan" in one hierarchical level higher, and selects any one of the facet values defined by the dictionary such as "Hokkaido", "Aomori", "Iwate", . . . , "Kyoto", . . . "Okinawa", excluding "Kyoto".

By the above process, it is possible to provide relevant information which is different from the previous one to the client terminal 20, taking advantage of the characteristics of the target program.

<5. Supplementary Explanation>

(Change of Facet Data)

In this embodiment, the relevant information of a target program is extracted by using the facet data as described above. The facet data is advantageous in that it can be extended without depending on the existing data structure. For example, the fifth facet item "goods" (products used in a program: costume, furniture, clock, program book such as original or commentary, program music such as opening song, insertion song or ending song, program video such as movie optical disc or drama optical disc), and the sixth facet item "time" (program date, season, year of event occurrence etc.) may be added to the facet data shown in FIG. 6 as shown in FIG. 13.

Figure 13:
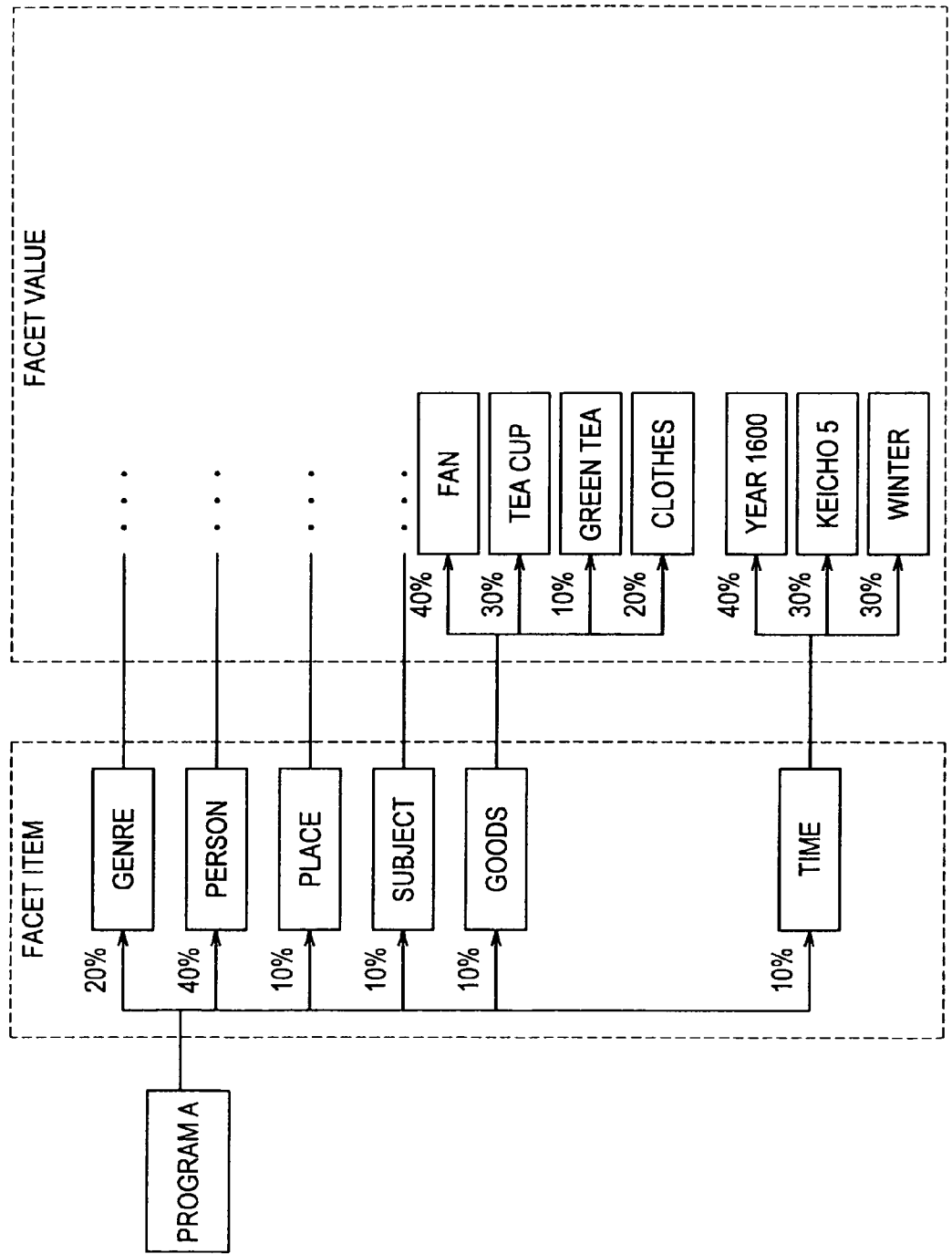
FIG. 13 is an explanatory view showing an extended example of facet data.

FIG. 13 is an explanatory view showing an extended example of facet data. As shown in FIG. 13, new facet items "goods" and "time", and facet values belonging to the respective facet items can be added to the facet data without rebuilding the existing database which is made up of the existing facet items and facet values. Note that, in the case of data in a hierarchical structure, it is necessary to rebuild the existing database when adding a new category.

(First Gui Example In Client Terminal 20)

Figure 14:
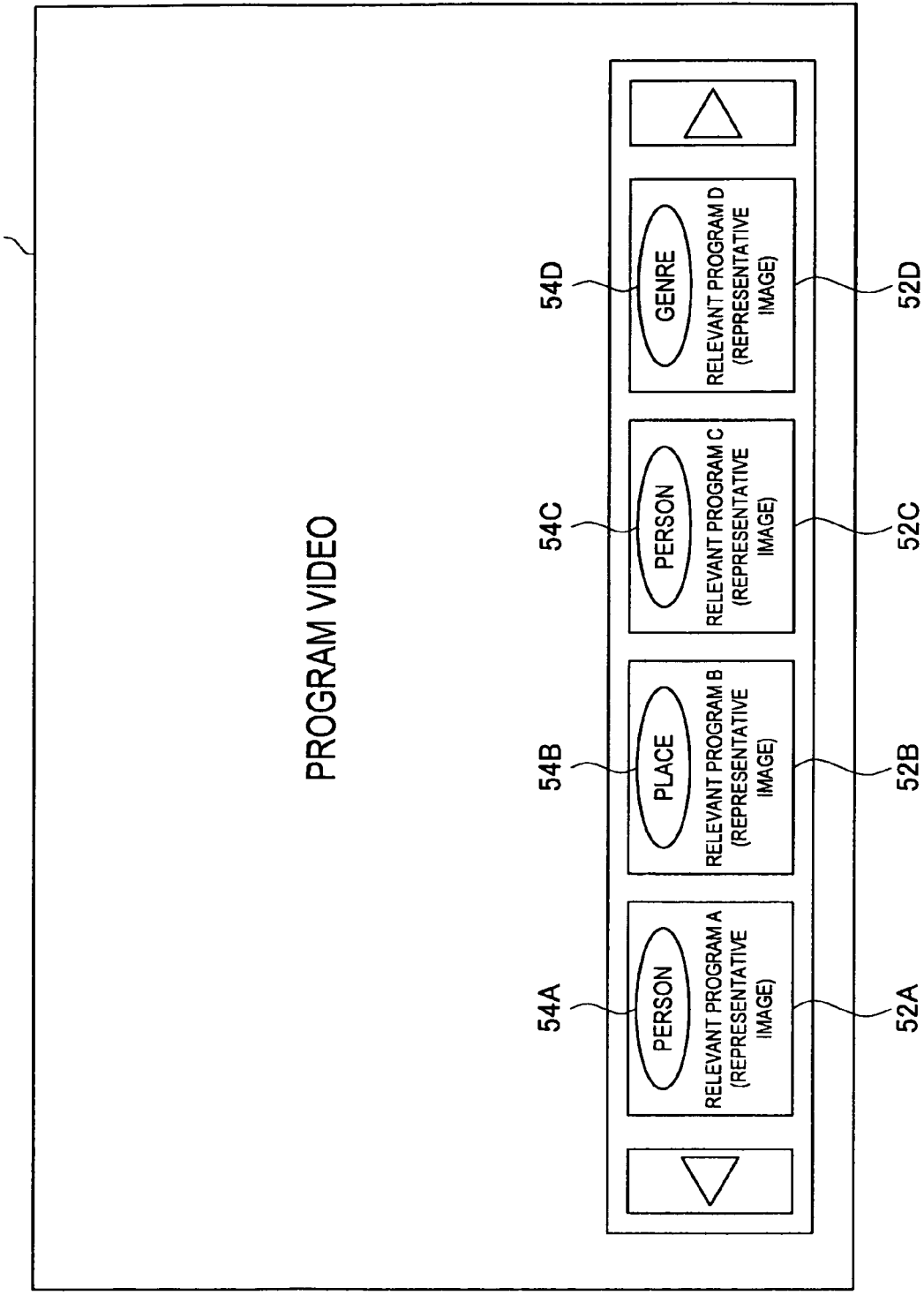
FIG. 14 is an explanatory view showing a GUI example of a relevant program (relevant information) displayed on a display unit of a client terminal.

FIG. 14 is an explanatory view showing a GUI example of a relevant program (relevant information) which is displayed on the display unit 24 of the client terminal 20. As shown in FIG. 14, the client terminal 20 may display icons 54A to 54D indicating the facet item with the highest priority in the facet data of each relevant program on representative images 52A to 52D of the respective relevant programs. A user can be thereby informed of the facet items which characterize the respective relevant programs.

(Second Gui Example In Client Terminal 20)

Figure 15:
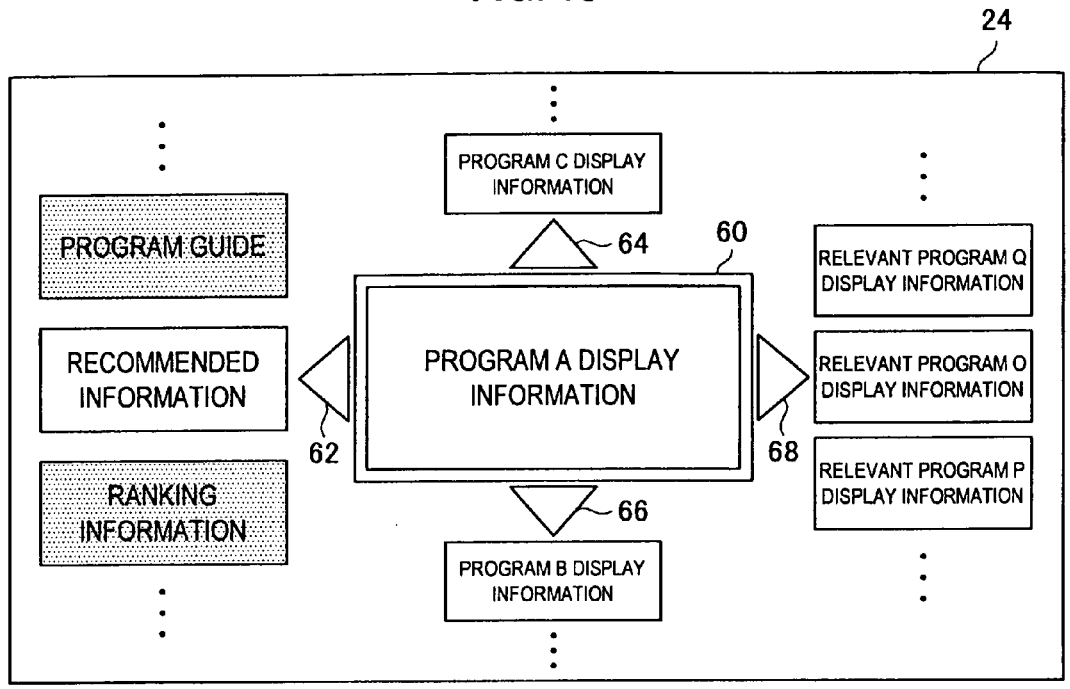
FIG. 15 is an explanatory view showing a GUI example for a program search displayed on a display unit of a client terminal.

FIG. 15 is an explanatory view showing a GUI example for a program search which is displayed on the display unit 24 of the client terminal 20. As shown in FIG. 15, display of search categories such as "program guide", "recommended information" and "ranking information" is included at the leftmost column of the GUI example for a program search. When any of those search categories is selected, display information of programs which belong to the selected search category are displayed at the middle column of the GUI. For example, when the search category "recommended information" is selected as shown in FIG. 15, display information of a program A, a program B, a program B and so on which belong to the search category "recommended information" are displayed. Note that the display information may be an image, a title, a caption or the like related to the program.

Further, as shown in FIG. 15, at the rightmost column of the GUI, display information (relevant information) of a plurality of programs relevant to the program A on which a cursor 60 is currently put is displayed. For example, when the cursor 60 is put on the display information of the program A as shown in FIG. 15, display information of relevant programs O, P, Q and so on which are relevant to the program A are displayed. Note that the display information of a plurality of programs relevant to the program A are provided from the ECG server 10 by the method described earlier in "4. Functions of ECG Server".

A user can search for a program by controlling a left key 62, an up key 64, a down key 66 or a right key 68 in such GUI. For example, a user can move the cursor 60 to the display information of the program C by controlling the up key 64. In this case, display at the right column of the GUI is switched to the display information of the relevant programs of the program C. Likewise, a user can move the cursor 60 to the display information of the program B by controlling the down key 66. In this case, display at the right column of the GUI is switched to the display information of the relevant programs of the program B.

Figure 16:
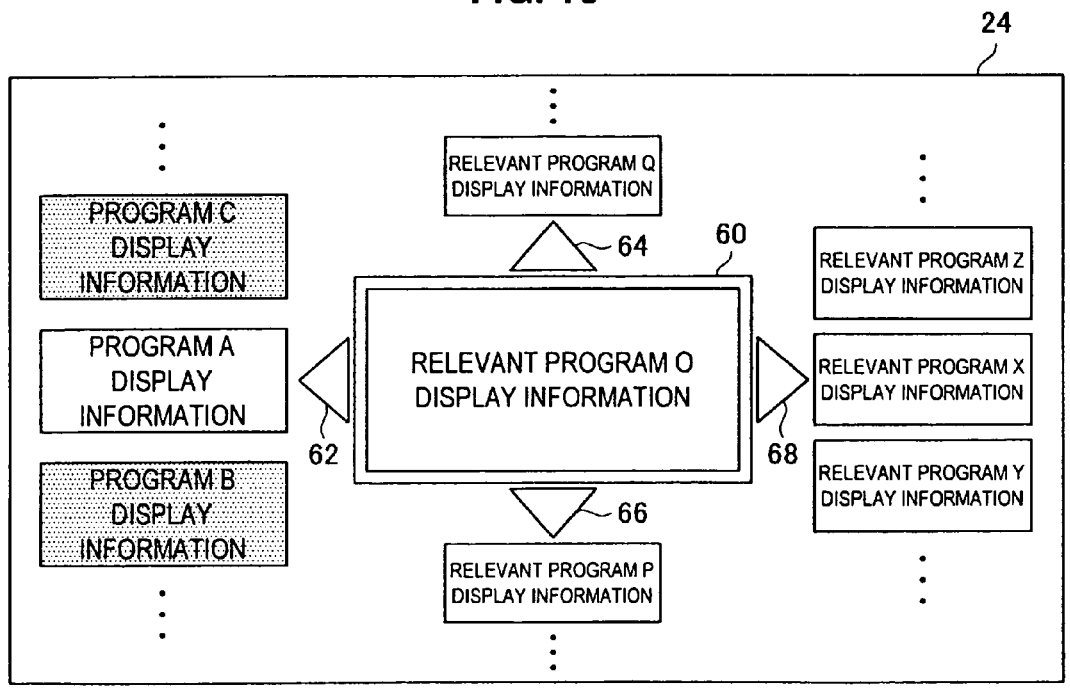
FIG. 16 is an explanatory view showing a GUI example for a program search displayed on a display unit of a client terminal.

Further, a user can move the cursor 60 to the display information of the relevant program O by controlling the right key 68, and further shift the display position of display information of relevant programs to the middle column as shown in FIG. 16. Then, at the right column of the GUI, the display information of programs X, Y, Z and so on which are relevant to the relevant program O on which the cursor 60 is put are newly displayed. In this manner, each time a user selects a program by controlling the right key 68, display information of relevant programs of the program are displayed, so that the user can search the relevant programs in a chained manner.

<6. SUMMARY>

As described above, the ECG server 10 according to the embodiment can automatically acquire a designated number of relevant information of a program which is identified by program identifying information received from the client terminal 20 by using facet data in which priorities are assigned to facet items and transmit the designated number of relevant information to the client terminal 20.

Further, the ECG server 10 according to the embodiment can automatically acquire relevant information of a program which is identified by program identifying information received from the client terminal 20 within the upper limit by using facet data in which priorities are assigned to facet items and transmit the relevant information within the upper limit to the client terminal 20.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the ECG server 10 of the specification in chronological order according to the sequence shown in sequence charts or flowcharts. For example, the steps in the processing of the ECG server 10 may be processed in a difference sequence from the sequence shown in sequence charts or flowcharts or may be processed in parallel.

Furthermore, it is possible to create a computer program that causes hardware such as the CPU 201, the ROM 202 and the RAM 203 incorporated in the ECG server 10 and the client terminal 20 to perform the equal functions to the elements of the ECG server 10 and the client terminal 20 described above. Further, a storage medium that stores such a computer program may be provided.

What is claimed is:

1. An information processing system comprising:
   a client terminal; and
   a server device including
   a storage unit that stores, for each content, facet data composed of a plurality of facet items and facet values hierarchically arranged in a lower level of each of the plurality of facet items, priorities being assigned to the plurality of facet items,
   a receiving unit that receives content identifying information for identifying one content from the client terminal,
   a selection unit that selects one or more than one facet item of the one content and any facet value belonging to each of the one or more than one facet item,
   an acquisition unit that acquires relevant information of the one content based on a selected facet item and a selected facet value selected by the selection unit, and
   a transmission unit that transmits the relevant information acquired by the acquisition unit to the client terminal,
   wherein when a number of the relevant information to be acquired by the acquisition unit is to be increased and the selection unit has selected a selected facet item having a lowest priority and has originally selected a selected facet value belonging to the selected facet item which is not in a highest hierarchical level of the selected facet value, the selection unit selects another facet value which is arranged in a higher hierarchical level than that of the originally selected facet value instead of the originally selected facet value, and
   wherein when decreasing the number of the relevant information to be acquired by the acquisition unit, the selection unit sets the selected facet item or items and the selected facet value or values to a state which existed prior to performing a process of increasing the number of the relevant information such that the selection unit selects, with regard to the selected facet item having the lowest priority, instead of the facet value selected previously during the process of increasing the number of the relevant information, a facet value arranged in a lower hierarchical level than that of the previously selected facet value.

2. The information processing system according to claim 1, wherein
   when increasing the number of the relevant information to be acquired by the acquisition unit and when the selected facet value belonging to the selected facet item with the lowest priority is in a highest hierarchical level, the selection unit clears selection of the selected facet value.

3. The information processing system according to claim 2, wherein
   when increasing the number of the relevant information to be acquired by the acquisition unit and when a number of selected facet items is more than one and the selected facet value belonging to the selected facet item with the lowest priority does not exist, the selection unit clears selection of the selected facet item with the lowest priority.

4. The information processing system according to claim 3, wherein
the receiving unit further receives a designated number for the relevant information from the client terminal,
the selection unit performs processing for increasing the number of the relevant information until exceeding the designated number,
the server device further includes a relevance calculation unit that calculates a relevance of the one content with each of relevant information acquired based on the selected facet item and the selected facet value selected by the selection unit, and
the acquisition unit acquires the designated number of the relevant information sequentially in descending order of the relevance calculated by the relevance calculation unit.

5. The information processing system according to claim 4, wherein
the acquisition unit acquires the relevant information of the one content based on a search condition that connects a logical OR of the selected facet values belonging to each of the one or more than one facet item by using a logical AND.

6. The information processing system according to claim 3, wherein
when decreasing the number of the relevant information to be acquired by the acquisition unit and when the selected facet value belonging to the selected facet item with the lowest priority is in a lowest hierarchical level and when a non-selected facet item exists among the plurality of facet items of the one content, the selection unit newly selects the facet item.

7. The information processing system according to claim 6, wherein
the receiving unit further receives an increase/decrease request for increasing/decreasing the number of the relevant information from the client terminal, and
in response to the increase/decrease request from the client terminal, the selection unit performs processing for increasing the number of the relevant information or processing for decreasing the number of the relevant information.

8. A server device comprising:
a storage unit that stores, for each content, facet data composed of a plurality of facet items and facet values hierarchically arranged in a lower level of each of the plurality of facet items, priorities being assigned to the plurality of facet items;
a receiving unit that receives content identifying information for identifying one content from a client terminal;
a selection unit that selects one or more than one facet item of the one content and any facet value belonging to each of the one or more than one facet item;
an acquisition unit that acquires relevant information of the one content based on a selected facet item and a selected facet value selected by the selection unit; and
a transmission unit that transmits the relevant information acquired by the acquisition unit to the client terminal,
wherein when a number of the relevant information to be acquired by the acquisition unit is to be increased and the selection unit has selected a selected facet item having a lowest priority and has originally selected a selected facet value belonging to the selected facet item which is not in a highest hierarchical level of the selected facet value, the selection unit selects another facet value which is arranged in a higher hierarchical level than that of the originally selected facet value instead of the originally selected facet value, and
wherein when decreasing the number of the relevant information to be acquired by the acquisition unit, the selection unit sets the selected facet item or items and the selected facet value or values to a state which existed prior to performing a process of increasing the number of the relevant information such that the selection unit selects, with regard to the selected facet item having the lowest priority, instead of the facet value selected previously during the process of increasing the number of the relevant information, a facet value arranged in a lower hierarchical level than that of the previously selected facet value.

9. A non-transitory computer readable medium having stored thereon a program causing a computer to function as a server device comprising:
a storage unit that stores, for each content, facet data composed of a plurality of facet items and facet values hierarchically arranged in a lower level of each of the plurality of facet items, priorities being assigned to the plurality of facet items;
a receiving unit that receives content identifying information for identifying one content from a client terminal;
a selection unit that selects one or more than one facet item of the one content and any facet value belonging to each of the one or more than one facet item;
an acquisition unit that acquires relevant information of the one content based on a selected facet item and a selected facet value selected by the selection unit; and
a transmission unit that transmits the relevant information acquired by the acquisition unit to the client terminal,
wherein when a number of the relevant information to be acquired by the acquisition unit is to be increased and the selection unit has selected a selected facet item having a lowest priority and has originally selected a selected facet value belonging to the selected facet item which is not in a highest hierarchical level of the selected facet value, the selection unit selects another facet value which is arranged in a higher hierarchical level than that of the originally selected facet value instead of the originally selected facet value, and
wherein when decreasing the number of the relevant information to be acquired by the acquisition unit, the selection unit sets the selected facet item or items and the selected facet value or values to a state which existed prior to performing a process of increasing the number of the relevant information such that the selection unit selects, with regard to the selected facet item having the lowest priority, instead of the facet value selected previously during the process of increasing the number of the relevant information, a facet value arranged in a lower hierarchical level than that of the previously selected facet value.

* * * * *